US011861962B1

(12) United States Patent
Principato

(10) Patent No.: US 11,861,962 B1
(45) Date of Patent: Jan. 2, 2024

(54) SMART LOCK SYSTEM

(71) Applicant: Micron Technology, Inc., Boise, ID (US)

(72) Inventor: Giuseppe Principato, Poing (DE)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/893,706

(22) Filed: Aug. 23, 2022

(51) Int. Cl.
G07C 9/22 (2020.01)
G07C 9/00 (2020.01)
H04L 9/32 (2006.01)
G08B 13/196 (2006.01)

(52) U.S. Cl.
CPC ............ G07C 9/22 (2020.01); G07C 9/00309 (2013.01); G08B 13/1961 (2013.01); H04L 9/3242 (2013.01); H04L 9/3247 (2013.01); G07C 2009/00412 (2013.01); G07C 2009/00769 (2013.01); H04L 2209/80 (2013.01)

(58) Field of Classification Search
CPC .............. G07C 9/22; G07C 9/00309; G07C 2009/00412; G07C 2009/00769; H04L 9/3242; H04L 9/3247
See application file for complete search history.

(56) References Cited

U.S. PATENT DOCUMENTS

| 9,729,524 | B1* | 8/2017 | Brandwine | ........... H04L 9/0894 |
| 2019/0043326 | A1* | 2/2019 | Madden | ................. H04N 7/185 |
| 2019/0065893 | A1* | 2/2019 | Chen | ...................... G06V 40/70 |
| 2020/0095800 | A1* | 3/2020 | Koski | .................... E05B 17/226 |
| 2020/0327758 | A1* | 10/2020 | Ma | ..................... G07C 9/00571 |
| 2021/0067747 | A1* | 3/2021 | Zheng | .................... H04N 7/186 |
| 2022/0319264 | A1* | 10/2022 | Anderson | .......... G07C 9/00309 |

\* cited by examiner

*Primary Examiner* — Nabil H Syed
(74) *Attorney, Agent, or Firm* — Greenberg Traurig

(57) ABSTRACT

A smart lock system and accompanying methods for utilizing the smart lock system are disclosed. The system incorporates a unique level of protection for the devices supporting the functionality of the smart lock system. Specifically, the system utilizes security features implemented on unique memory devices of the devices to increase access security of gateways, such as doors, windows, garages, and other points of access. The memory devices of the devices of the smart lock system may be utilized to provide commands and signatures to verify the identities of the devices, provide anti-replay protection, provide data attestation, and verify component identity. The commands and signatures may be utilized to activate or deactivate other devices in the smart lock system, such as in a particular sequence to unlock or lock an access point. The smart lock system may be used to activate cameras and alert authorities upon detection of a potential intrusion.

22 Claims, 6 Drawing Sheets

SMART LOCK SYSTEM

FIELD OF THE TECHNOLOGY

At least some embodiments disclosed herein relate to security systems, cryptography technologies, and memory devices in general, and more particularly, but not limited to, a smart lock system and accompanying methods for utilizing the smart lock system.

BACKGROUND

In today's technological age, an increased emphasis on automation, while also ensuring high levels of security, has taken hold. Electronic locks, often associated with cars, have been developed and have been increasingly used in private and commercial buildings. People and business choose them for their homes and companies, for a variety of reasons. For example, electronic locks are often the most effective system to protect and control the environments of their home or company location. The locking mechanism typically consists of using a stop to block the space between the door side and the door frame. At the mechanical level, the options may include the simple bolt that is held in place by special springs, the bolt, traditionally considered safer because it is able to remain in place until manual unlocking is performed. For locks, the lock and unlock typically takes place by turning an element, such as a knob or a key inserted into an opening of the knob. Electronic locks have a mechanism that connects the bolt (or cylinder) with a small engine inside the door. This movement may be controlled based on electrical impulses and can be activated by a digital keyboard, a remote control, an application, a fingerprint reader or a proximity detector. Whatever the mechanism used, the electronic lock is designed in such a way as to start the engine release only when the electronic impulse has been received.

Notably, however, any method or system for closing locks, including traditional and electronic, also has disadvantages. For example, the keys, which may be metallic or magnetic, and small remote controls can be lost or damaged, while forgotten numerical access codes may hinder access and may potentially be compromised by malfeasants. Matching keys or remote controls is complex and often requires special skills, while, for example, modifying numeric codes that guarantee access to ports with digital keyboard is simple and quick, as well as being able to manage the locking system from a mobile phone. However, a power failure can, in fact, make it impossible to open or close the door until electricity is restored. To overcome this problem, electronic locks often have a combination of electronic closing control associated with a physical key, which guarantees the maximum possible level of security. As a result, a physical key is always provided for both installation and emergency support. The electronic locks therefore allow the advantages of physical keys to be combined in the same product and those of technologically very advanced systems. If it is very convenient to use the remote control or keyboard in everyday life, being able to count on a physical key guarantees a secure backup when needed.

To that end, electronic locks have been developed, which replace traditional keys used for locks by exploiting various developments relating to home automation. Currently, there are numerous types of intelligent lock devices and systems that may be utilized to secure a home, a workplace, or other location or venue. For example, in addition to traditional lock and key-based devices, there exist key-pad entry locks, short-range protocol-based locking systems where each device in the system communicates with other devices within a certain vicinity (e.g., Bluetooth), locks equipped with WiFi modules that may be connected to a wireless network or smart device and controlled using applications, biometric locking systems (e.g., using fingerprint or iris scans to gain access to an access point), Z-wave locking systems that pair with digital assistants to facilitate locking and unlocking of an equipped lock, among other types of lock technologies. In addition to the forgoing, there are also locking systems that allow for remote control of locks. Remote controls can take place both manually via a click on the screen of the controller device and through a voice command provided as input to an interactive voice assistant executing on the controller device. This technology typically provides full control of locks and doors at any time of the day even if a person is not physically close to the environments containing the locks and doors. In this way, certain risks of may be considerably reduced.

Communication with various smart systems is almost immediate and is available to everyone including, but not limited to, less experienced users, enthusiasts, and professionals in the security sector. Depending on the type and system used, each lock may also involve the presence of an application to be downloaded, which can enable a user to customize each parameter of a security system according to their needs. Ease-of-use and convenience are often reasons for the success of the foregoing technologies in the marketplace and with users. For example, in systems not requiring a physical key to open and close a door, such systems help to reduce the risk of key loss based on a user's forgetfulness or misplacement of the physical key or theft of the key. Certain smart locking systems allow a user to check the lock status at any time and, thanks to integrated technologies, they are typically unlockable only by the owner or by selected authorized persons. Additionally, certain electronic locking systems require relatively little maintenance (except in the invent of breakage or vandalism occurring) and therefore provide potential economic savings.

Despite the foregoing technologies, there still remains room for substantial enhancements and improvements to lock systems and devices. For example, existing locking technologies are often susceptible to hacking, component breakage, ineffective communication capabilities, security implemented only at the software level, component tampering, among other deficiencies. Additionally, existing technologies may be susceptible to single points of failure and extended periods of downtime. As a result, enhancements and improvements to locking technologies may provide cost savings, enhanced locking-related versatility, enhanced security, reduced intrusions, and enhanced responses times by security personnel or emergency services.

BRIEF DESCRIPTION OF THE DRAWINGS

The embodiments are illustrated by way of example and not limitation in the figures of the accompanying drawings in which like references indicate similar elements.

DETAILED DESCRIPTION

The following disclosure describes various embodiments of a smart lock system 100 and accompanying methods of utilizing the smart lock system 100. In particular, the system 100 involves incorporating a unique level of protection for the devices supporting the functionality of the smart lock system 100. Specifically, the system 100 utilizes security features implemented on unique memory devices of the devices in the system 100 to increase access security of gateways, such as doors, windows, garages, and other access points. The memory devices (e.g., memory device 310) of the devices of the smart lock system 100 may be utilized to provide commands and signatures to verify the identities of the devices in the smart lock system 100, provide anti-replay protection, provide data attestation, and verify component identity. In various embodiments, the commands and signatures may be utilized to activate or deactivate other devices in the smart lock system 100, such as in a particular sequence to unlock or lock an access point. In certain embodiments, the smart lock system 100 may be utilized to activate cameras and alert authorities upon detection of a potential intrusion.

Figure 1:
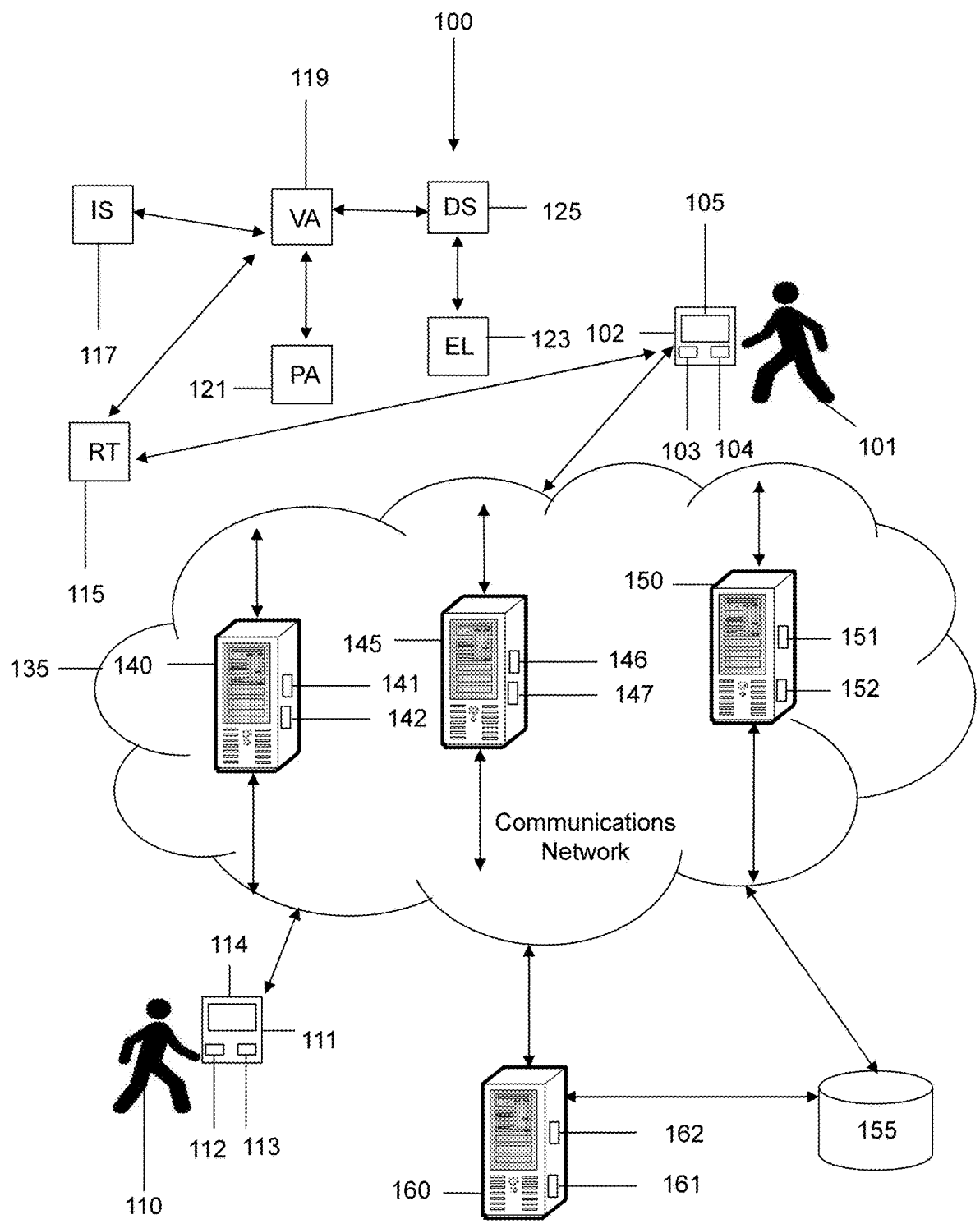
FIG. 1 illustrates a schematic diagram of a system for providing smart locking capabilities by utilizing security features of memory devices in accordance with embodiments of the present disclosure.
Figure 2:
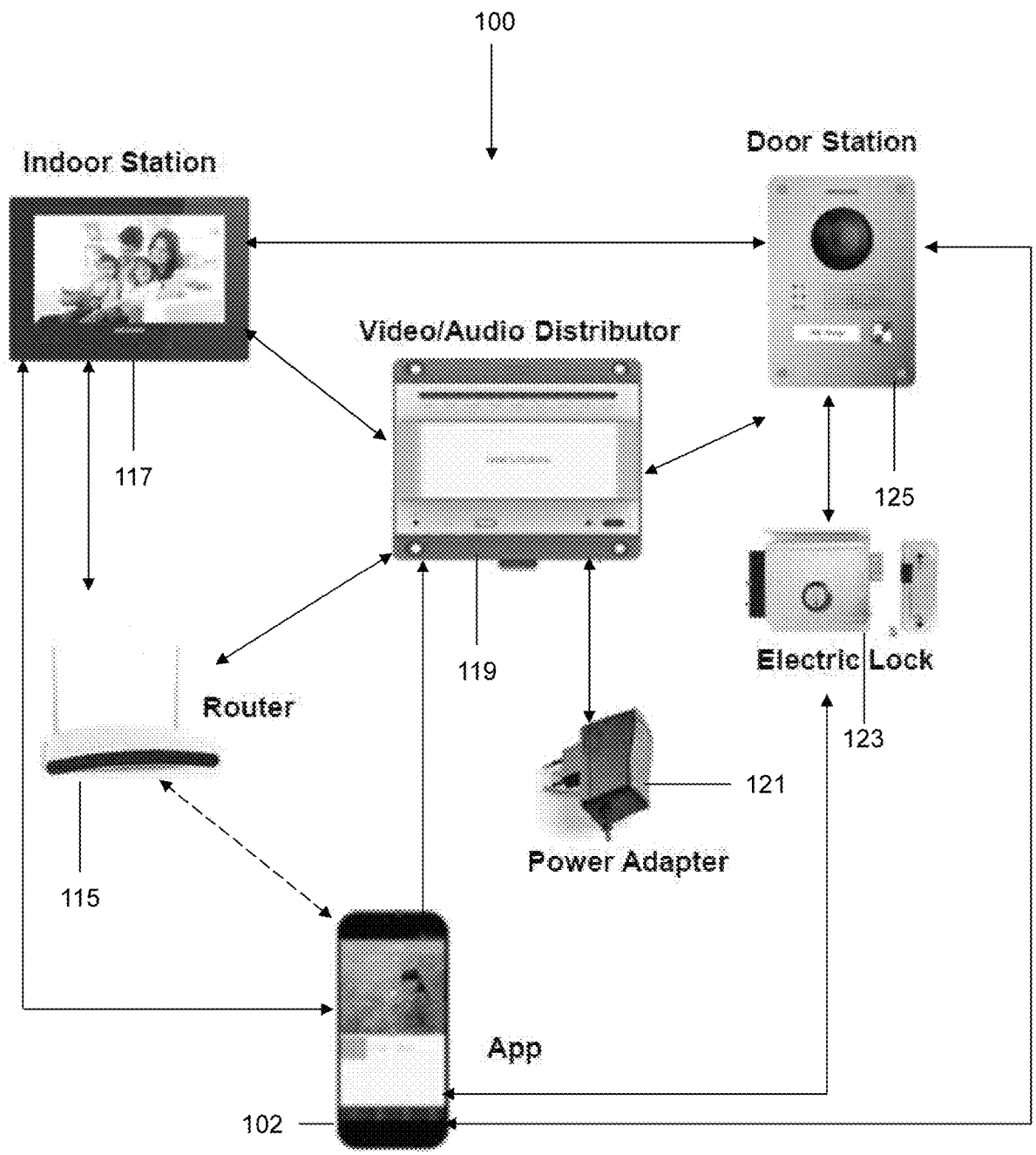
FIG. 2 illustrates a schematic diagram illustrating various components of the system for providing smart locking capabilities in accordance with embodiments of the present disclosure.

Referring now also to FIG. 1 and FIG. 2, FIG. 1 illustrates a schematic diagram of a smart lock system 100 in accordance with embodiments of the present disclosure and FIG. 2 illustrates a schematic diagram of various components of the smart lock system 100. Notably, the system 100 may be configured to support, but is not limited to supporting, security systems and services, monitoring systems and services, alert systems and services, memory systems and services, data analytics systems and services, data collation and processing systems and services, artificial intelligence services and systems, machine learning services and systems, content delivery services, cloud computing services, satellite services, telephone services, voice-over-internet protocol services (VoIP), software as a service (SaaS) applications, platform as a service (PaaS) applications, gaming applications and services, social media applications and services, operations management applications and services, productivity applications and services, mobile applications and services, any other computing applications and services, or a combination thereof. Notably, the system 100 may include a first user 101, who may utilize a first user device 102 to access data, content, and services, or to perform a variety of other tasks and functions. As an example, the first user 101 may utilize first user device 102 to transmit signals to access various online services and content, such as those available on an internet, on mobile devices, on other devices, on various computing systems, or a combination thereof. As another example, the first user device 102 may be utilized to access an application, devices, components of the system 100 that provide any or all of the operative functions of the system 100, or a combination thereof. In certain embodiments, the first user 101 may be any type of person, a robot, a humanoid, a program, a computer, any type of user, or a combination thereof. In certain embodiments, the first user 101 may be a person that may seek to gain access to and secure an access point, such as the first user's 101 home, business, vehicle, or other access point. For example, the first user 101 may wish to lock or unlock an electronic lock 123 at the first user's 101 home. As another example, the first user 101 may wish to view information, such as video content recorded by a door station 125 including a camera located at the first user's 101 home. The video content may be of an environment that the first user's 101 home, business, vehicle, or other access point is located in.

Figure 3:
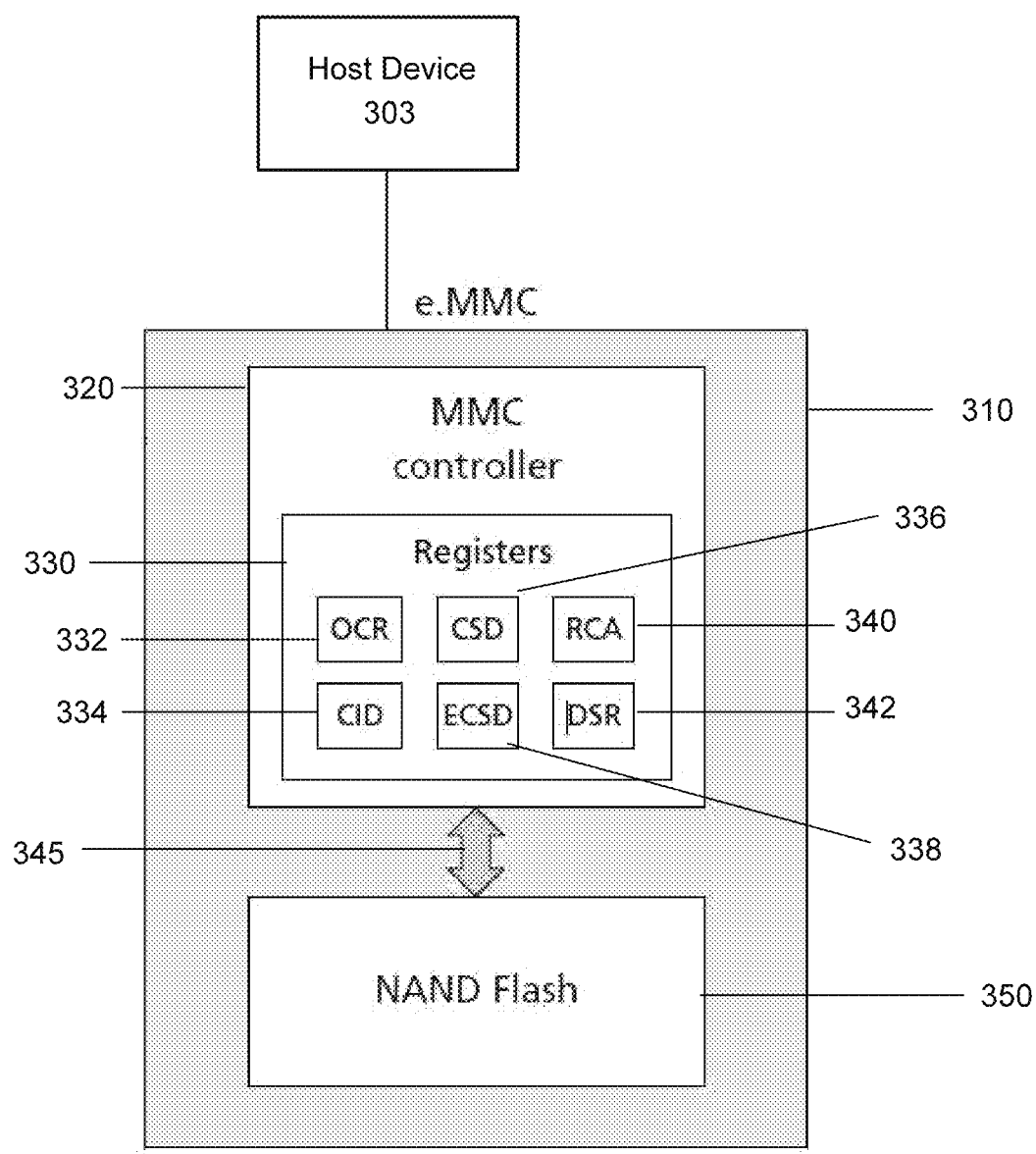
FIG. 3 illustrates a schematic diagram of an exemplary memory device including security features that may be utilized with various components of a system for providing smart locking capabilities in accordance with embodiments of the present disclosure.

In certain embodiments, the first user device 102 may include a memory 103 that includes instructions, and a processor 104 that executes the instructions from the memory 103 to perform the various operations that are performed by the first user device 102. In certain embodiments, the processor 104 may be hardware, software, or a combination thereof. The first user device 102 may also include an interface 105 (e.g. screen, monitor, graphical user interface, etc.) that may enable the first user 101 to interact with various applications executing on the first user device 102 and to interact with the system 100. In certain embodiments, the first user device 102 may be and may include a computer, any type of sensor, a laptop, a set-top-box, a tablet device, a phablet, a server, a mobile device, a smartphone, a smart watch, any other type of computing device, or a combination thereof. In certain embodiments, the first user device 102 may be an electronic key that may be configured to include processors, memories, communication modules, other componentry, or a combination thereof. In certain embodiments, the first user device 102 may also include a physical key, a digital key (e.g., implemented in software), or a combination thereof, that may be utilized to open a lock, such as electronic lock device 123. Illustratively, the first user device 102 is shown as a smartphone device in FIG. 1. In certain embodiments, the first user device 102 may be utilized by the first user 101 to control and provide some or all of the operative functionality of the system 100. In certain embodiments, the memory 103 may include non-volatile memory, such as, but not limited to, a flash memory (e.g., NAND flash memory), solid-state memory (e.g., SSD), read-only memory (ROM), programmable ROM, electrically programmable ROM, other types of non-volatile memory, or a combination thereof. In certain embodiments, the memory 103 may also include volatile memory as well. In preferred embodiments, the memory 103 may be and may include embedded MultiMediaCard memory (eMMC), such as eMMC 310, as shown in FIG. 3. Further details relating to the eMMC 310 are provided below.

In addition to using first user device 102, the first user 101 may also utilize and have access to additional user devices. As with first user device 102, the first user 101 may utilize the additional user devices to transmit signals to access various online services and content. The additional user devices may include memories that include instructions, and processors that executes the instructions from the memories to perform the various operations that are performed by the additional user devices. In certain embodiments, the processors of the additional user devices may be hardware, software, or a combination thereof. The additional user devices may also include interfaces that may enable the first user 101 to interact with various applications executing on the additional user devices and to interact with the system 100. In certain embodiments, the first user device 102 and the additional user devices may be and may include a computer, any type of sensor, a laptop, a set-top-box, a tablet device, a phablet, a server, a mobile device, a smartphone, a smart watch, any other type of computing device, or a combination thereof. Sensors may include, but are not limited to, cameras, motion sensors, facial-recognition sensors, acoustic sensors, audio sensors, pressure sensors, temperature sensors, light sensors, humidity sensors, any type of sensors, or a combination thereof.

The first user device 102 and additional user devices may belong to a communications network, form a communications network, or a combination thereof. In certain embodiments, the communications network may be a local, mesh, or other network that enables and facilitates various aspects of the functionality of the system 100. In certain embodiments, the communications network may be formed between the first user device 102 and additional user devices using any type of wireless protocol, other protocol, technology, or a combination thereof. For example, user devices may communicate with one another in the communications network by utilizing any protocol, wireless technology, satellite, fiber, or any combination thereof. Notably, the communications network may be configured to communicatively link with any other network of the system, communicate with any other network of the system 100, communicatively link with any network outside the system 100, or a combination thereof.

In certain embodiments, the first user device 102 and additional user devices belonging to the communications network may share and exchange data with each other via the communications network. For example, the user devices may share information relating to the various components of the user devices, information associated with content accessed by a user of the user devices, information identifying the locations of the user devices, information indicating the types of sensors that are contained in the user devices, information indicating the types of sensors on the user devices, information identifying the applications being utilized on the user devices, information identifying how the user devices are being utilized by a user, information identifying user profiles for users of the user devices, information identifying device profiles for the user devices, information identifying the number of devices in the communications network, information identifying devices being added to or removed from the communications network, any other information, or any combination thereof. In certain embodiments, the term information, as utilized in the present disclosure, may also include, but is not limited to, any type of content (e.g., audio content, visual content, audiovisual content, virtual reality content, augmented reality content, haptic content, etc.), any type of data (e.g., sensor data, historical data, etc.), any type of signals (e.g., signals transmitted to or from any device of the system 100), any type of metadata, any type of measurements, any type of services, any type of algorithms (e.g., used for artificial intelligence, etc.), activity information, predictions made by the system 100, profiles, device characteristics, communications, artificial intelligence models, or any combination thereof.

In addition to the first user 101, the system 100 may also include a second user 110. In certain embodiments, for example, the second user 110 may be another person that may seek to access and unlock an electronic lock 123 located at a commercial building, home, or other location. In certain embodiments, the second user device 111 may be utilized by the second user 110 to transmit signals to request various types of information, content, services, and data provided by communications network 135, data accessible by communications network 135, data provided by or accessible by any other network in the system 100, or a combination thereof. In further embodiments, the second user 110 may be a robot, a computer, a vehicle, a humanoid, an animal, any type of user, or any combination thereof. The second user device 111 may include a memory 112 that includes instructions, and a processor 113 that executes the instructions from the memory 112 to perform the various operations that are performed by the second user device 111. In certain embodiments, the processor 113 may be hardware, software, or a combination thereof. The second user device 111 may also include an interface 114 (e.g. screen, monitor, graphical user interface, etc.) that may enable the first user 101 to interact with various applications executing on the second user device 111 and, in certain embodiments, to interact with the system 100. In certain embodiments, the second user device 111 may be a computer, a laptop, a set-top-box, a tablet device, a phablet, a server, a mobile device, a smartphone, a smart watch, any other type of computing device, or a combination thereof. Illustratively, the second user device 111 is shown as a mobile device in FIG. 1. In certain embodiments, the second user device 111 may also include sensors, such as, but are not limited to, cameras, audio sensors, motion sensors, pressure sensors, temperature sensors, light sensors, humidity sensors, any type of sensors, or a combination thereof. In certain embodiments, the memory 112 may include non-volatile memory, such as, but not limited to, a flash memory (e.g., NAND flash memory), solid-state memory (e.g., SSD), read-only memory (ROM), programmable ROM, electrically programmable ROM, other types of non-volatile memory, or a combination thereof. In certain embodiments, the memory 112 may also include volatile memory as well. In preferred embodiments, the memory 112 may be may include embedded MultiMediaCard memory (eMMC), such as eMMC 310, as shown in FIG. 3, or a combination thereof.

In certain embodiments, the first user device 102, the additional user devices, the second user device 111, or a combination thereof, may have any number of software applications and application services stored and accessible thereon. For example, the first user device 102, the additional user devices, the second user device 111, or a combination thereof, may include applications for controlling and accessing the operative features and functionality of the system 100, applications for controlling and accessing any device of the system 100, applications for locking and unlocking the electronic lock 123, interactive social media applications, biometric applications, cloud-based applications, VoIP applications, other types of phone-based applications, product-ordering applications, business applications, e-commerce applications, media streaming applications, content-based applications, media-editing applications, database applications, gaming applications, internet-based applications, browser applications, mobile applications, service-based applications, productivity applications, video applications, music applications, any other type of applications, any types of application services, or a combination thereof. In certain embodiments, the software applications may support the functionality provided by the system 100 and methods described in the present disclosure. In certain embodiments, the software applications and services may include one or more graphical user interfaces so as to enable the first and second users 101, 110 to readily interact with the software applications. The software applications and services may also be utilized by the first and second users 101, 110 to interact with any device in the system 100, any network in the system 100, or any combination thereof. In certain embodiments, the first user device 102, the additional user devices, the second user device 111, or a combination thereof, may include associated telephone numbers, device identities, or any other identifiers to uniquely identify the first user device 102, the additional user devices, the second user device 111, or a combination thereof.

In certain embodiments, the system 100 may include a router 115, which may be configured to route information, data, content, or a combination thereof, between and among the devices in the system 100. In certain embodiments, the router 115 may include processors, memories, communication modules, antennae, any componentry of a router, or a combination thereof. In certain embodiments, the router 115 may be configured to receive requests (e.g., a request to unlock or lock the electronic lock device 123) from the first user device 102, the second user device 111, the indoor station 117, the door station 125, the electronic lock device 123, the content distributor device 119, any device in or outside the system 100, or a combination thereof, and forward the requests to destinations specified in the requests. The router 115 may also be configured to receive responses in response to the requests from any of the devices in the system 100 and transmit the responses to requestors any other intended recipients, or a combination thereof. In certain embodiments, the router 115 may be a gateway, a switch, any type of router, or a combination thereof. In certain embodiments, the memory of the router 115 may include non-volatile memory, such as, but not limited to, a flash memory (e.g., NAND flash memory), solid-state memory (e.g., SSD), read-only memory (ROM), programmable ROM, electrically programmable ROM, other types of non-volatile memory, or a combination thereof. In certain embodiments, the memory of the router 115 may also include volatile memory as well. In preferred embodiments, the memory of the router 115 may be and may include embedded MultiMediaCard memory (eMMC), such as eMMC 310, as shown in FIG. 3.

In certain embodiments, the system 100 may include an indoor station 117, which may be located within a location, such as the first user's 101 home. The indoor station 117 may be a computing device including any number of processors, memories, or a combination thereof implemented in software, hardware, or a combination thereof. The indoor station 117 may be equipped with a camera, a user interface (e.g., a touchscreen), a microphone, a speaker, communication modules (e.g., Bluetooth, transceivers, Z-Wave, IoT, RFID, etc.), antennae, any other componentry or a combination thereof. In certain embodiments, the indoor station 117 may include sensors including, but not limited to, motion sensors, facial-recognition sensors, acoustic sensors, audio sensors, pressure sensors, temperature sensors, light sensors, humidity sensors, any type of sensors, or a combination thereof. In certain embodiments, the camera may be configured to record and stream information, such as media content taken of an environment in which the indoor station 117 is located. For example, the camera may be configured to record media content of an environment within a home of the first user 101, second user 110, or a combination thereof, that is within a viewing range of the camera lens of the camera of the indoor station 117. The microphone may be configured to pick up and record audio occurring in the environment, and the speaker may be configured to output recorded audio, audio occurring in real-time in the environment, or a combination thereof. In certain embodiments, the memory of the indoor station 117 may include non-volatile memory, such as, but not limited to, a flash memory (e.g., NAND flash memory), solid-state memory (e.g., SSD), read-only memory (ROM), programmable ROM, electrically programmable ROM, other types of non-volatile memory, or a combination thereof. In certain embodiments, the memory of the indoor station 117 may also include volatile memory as well. In preferred embodiments, the memory of the indoor station 117 may be and may include an eMMC, such as eMMC 310, as shown in FIG. 3.

In certain embodiments, the system 100 may include a content distributor device 119. The content distributor device 119 may be configured to distribute information and media content obtained from the indoor station 117, the door station 125, the first user device 102, the second user device 111, any other device of the system 100, or a combination thereof. The media content may include, but is not limited to, audio content, video content, virtual reality content, augmented reality content, any type of content, or a combination thereof. The content distributor device 119 may include any number of processors, memories, or a combination thereof, implemented in software, hardware, or a combination thereof. The content distributor device 119 may be equipped with a camera, a user interface (e.g., a touchscreen), a microphone, a speaker, communication modules (e.g., Bluetooth, transceivers, Z-Wave, IoT, RFID, etc.), antennae, any other componentry, or a combination thereof. In certain embodiments, the camera may be configured to record and stream information, such as media content taken of an environment in which the content distributor device 119 is located. For example, the camera may be configured to record media content of an environment within a home of the first user 101 the second user 110, or a combination thereof, that is within a viewing range of the camera lens of the camera of the content distributor device 119. The microphone may be configured to pick up and record audio occurring in the environment, the speaker may be configured to output recorded audio, audio occurring in real-time in the environment, or a combination thereof. In certain embodiments, the memory of the content distributor device 119 may include non-volatile memory, such as, but not limited to, a flash memory (e.g., NAND flash memory), solid-state memory (e.g., SSD), read-only memory (ROM), programmable ROM, electrically programmable ROM, other types of non-volatile memory, or a combination thereof. In certain embodiments, the memory of the content distributor device 119 may also include volatile memory as well. In preferred embodiments, the memory of the content distributor device 119 may be and may include an eMMC, such as eMMC 310, as shown in FIG. 3.

In certain embodiments, the system 100 may include a power adapter 121, which may be configured to supply power to one or more of the devices of the smart lock system 100. In certain embodiments, the power adapter 121 may be an AC-to-DC adapter, a computer adapter, a power plug, any other type of power adapter, or a combination thereof. For example, the power adapter 121 may be configured to adapt electricity from household mains voltage from a home of the first user 101 to low voltage DC that is suitable for the indoor station 117, the door station 125, the electronic lock 123, the content distributor device 119, the router 115, the first user device 102, the second user device 111, or a combination thereof.

In certain embodiments, the system 100 may include a door station 125, which may be located outside a location, such as on the outside of the first user's 101 home (e.g., on the front door, for example). The door station 125 may include any number of processors, memories, or a combination thereof, implemented in software, hardware, or a combination thereof. The door station 125 may include a camera, a user interface (e.g., a touchscreen), a microphone, a speaker, communication modules (e.g., Bluetooth, transceivers, Z-Wave, IoT, RFID, etc.), antennae, any other componentry, or a combination thereof. Door station 125 may be configured to include sensors including, but not limited to, motion sensors, facial-recognition sensors, acoustic sensors, audio sensors, pressure sensors, temperature sensors, light sensors, humidity sensors, any type of sensors, or a combination thereof. In certain embodiments, the camera may be configured to record and stream information, such as media content taken of an environment in which the door station 125 is located. For example, the camera may be configured to record media content of the environment in front of the first user's 101 home that lies within a viewing range of the lens of the camera. The microphone may be configured to pick up and record audio occurring in the environment and the speaker may be configured to output recorded audio, audio occurring in real-time in the environment, or a combination thereof. For example, the first user 101 may speak through a microphone of the first user device 102 and have the speech audio output via the speaker of the door station 125 to talk to a person outside the first user's 101 home. In certain embodiments, the memory of the door station 125 may include non-volatile memory, such as, but not limited to, a flash memory (e.g., NAND flash memory), solid-state memory (e.g., SSD), read-only memory (ROM), programmable ROM, electrically programmable ROM, other types of non-volatile memory, or a combination thereof. In certain embodiments, the memory of the door station 125 may also include volatile memory as well. In preferred embodiments, the memory of the door station 125 may be and may include an eMMC, such as eMMC 310, as shown in FIG. 3.

In certain embodiments, the system 100 may further include an electronic lock device 123, which may, for example, be utilized to secure a door, window, other access point, or a combination thereof, to the first user's 101 home. In certain embodiments, the electronic lock device 123 may include any number of processors, memories, or a combination thereof, implemented in software, hardware, or a combination thereof. In certain embodiments, the electronic lock device 123 may include a bolt or cylinder which connect to a motor, such as by utilizing an actuator. In certain embodiments, the electronic lock device 123 may include sensors including, but not limited to, cameras, motion sensors, facial-recognition sensors, acoustic sensors, audio sensors, pressure sensors, temperature sensors, light sensors, humidity sensors, any type of sensors, or a combination thereof. The motor may be controlled via electrical impulse, which may be triggered by a keypad, by a signal from the first user device 102 (and/or any other device of the system 100), a wireless remote, an electronic reader, any other device, or a combination thereof. The electrical impulse may be utilized to lock the electronic lock device 123 or unlock the electronic lock device 123. In certain embodiments, the electronic lock device 123 may include a camera, a user interface (e.g., a touchscreen), a microphone, a speaker, communication modules (e.g., Bluetooth, transceivers, Z-Wave, IoT, RFID, etc.), antennae, any other componentry, or a combination thereof. In certain embodiments, the camera may be configured to record and stream information, such as media content taken of an environment in which the electronic lock device 123 is located. For example, the camera may be configured to record media content of the environment in front of the first user's 101 home that lies within a viewing range of the lens of the camera. The microphone may be configured to pick up and record audio occurring in the environment and the speaker may be configured to output recorded audio and/or audio occurring in real-time in the environment. In certain embodiments, the memory of the electronic lock device 123 may include non-volatile memory, such as, but not limited to, a flash memory (e.g., NAND flash memory), solid-state memory (e.g., SSD), read-only memory (ROM), programmable ROM, electrically programmable ROM, other types of non-volatile memory, or a combination thereof. In certain embodiments, the memory of the electronic lock device 123 may also include volatile memory as well. In preferred embodiments, the memory of the electronic lock device 123 may be and may include an eMMC, such as eMMC 310, as shown in FIG. 3.

In certain embodiments, the system 100 may also include a communications network 135. The communications network 135 may be under the control of a service provider, a business providing access to one or more applications supporting the functionality of the system 100, the first user 101, any other designated user, a computer, another network, or a combination thereof. The communications network 135 of the system 100 may be configured to link each of the devices in the system 100 to one another. For example, the communications network 135 may be utilized by the first user device 102 to connect with other devices within or outside communications network 135. Additionally, the communications network 135 may be configured to transmit, generate, and receive any information and data traversing the system 100. In certain embodiments, the communications network 135 may include any number of servers, databases, or other componentry. The communications network 135 may also include and be connected to a mesh network, a local network, a cloud-computing network, a security network, a wireless network, an Ethernet network, a satellite network, a broadband network, a cellular network, a private network, a cable network, the Internet, an internet protocol network, MPLS network, a content distribution network, any network, or any combination thereof. Illustratively, servers 140, 145, and 150 are shown as being included within communications network 135. In certain embodiments, the communications network 135 may be part of a single autonomous system that is located in a particular geographic region or be part of multiple autonomous systems that span several geographic regions.

Notably, certain functionality of the system 100 may be supported and executed by using any combination of the servers 140, 145, 150, and 160. The servers 140, 145, and 150 may reside in communications network 135, however, in certain embodiments, the servers 140, 145, 150 may reside outside communications network 135. The servers 140, 145, and 150 may provide and serve as a server service that performs the various operations and functions provided by the system 100. In certain embodiments, the server 140 may include a memory 141 that includes instructions, and a processor 142 that executes the instructions from the memory 141 to perform various operations that are performed by the server 140. The processor 142 may be hardware, software, or a combination thereof. Similarly, the server 145 may include a memory 146 that includes instructions, and a processor 147 that executes the instructions from the memory 146 to perform the various operations that are performed by the server 145. Furthermore, the server 150 may include a memory 151 that includes instructions, and a processor 152 that executes the instructions from the memory 151 to perform the various operations that are performed by the server 150. In certain embodiments, the servers 140, 145, 150, and 160 may be network servers, routers, gateways, switches, media distribution hubs, signal transfer points, service control points, service switching points, firewalls, routers, edge devices, nodes, computers, mobile devices, or any other suitable computing device, or any combination thereof. In certain embodiments, the servers 140, 145, 150 may be communicatively linked to the communications network 135, any network, any device in the system 100, or any combination thereof.

The database 155 of the system 100 may be utilized to store and relay information that traverses the system 100, cache content that traverses the system 100, store data about each of the devices in the system 100 and perform any other typical functions of a database. In certain embodiments, the database 155 may be connected to or reside within the communications network 135, any other network, or a combination thereof. In certain embodiments, the database 155 may serve as a central repository for any information associated with any of the devices and information associated with the system 100. Furthermore, the database 155 may include a processor and memory or may be connected to a processor and memory to perform the various operation associated with the database 155. In certain embodiments, the database 155 may be connected to the servers 140, 145, 150, 160, the first user device 102, the second user device 111, the additional user devices, any devices in the system 100, any process of the system 100, any program of the system 100, any other device, any network, or any combination thereof.

The database 155 may also store information including, but not limited to, metadata obtained from the system 100, store metadata and other information associated with the first and second users 101, 110, store artificial intelligence models utilized in the system 100, store sensor information, data, and content obtained from an environment associated with the first and second users 101, 110 (e.g., obtained from an environment including the first user's 101 monitored home), store predictions made by the system 100 and artificial intelligence models, store user profiles associated with the first and second users 101, 110, store device profiles associated with any device in the system 100, store communications traversing the system 100, store user preferences, store information associated with any device or signal in the system 100, store information relating to patterns of usage relating to the user devices 102, 111, store any information obtained from any of the networks in the system 100, store historical data associated with the first and second users 101, 110, store device characteristics, store information relating to any devices associated with the first and second users 101, 110, store information associated with the communications network 135, store any information generated by the system 100, store any information processed by the system 100, store any of the information disclosed for any of the operations and functions disclosed for the system 100 herewith, store any information traversing the system 100, or any combination thereof. Furthermore, the database 155 may be configured to process queries sent to it by any device in the system 100.

In certain embodiments and referring now also to FIG. 3, the system 100 may incorporate the use of eMMC's 310 in some or all the devices in the system 100. In certain embodiments, the eMMC 310 may include a MMC controller 320, a communications interface 345, and a NAND flash memory 350, which, in certain embodiments, may all reside on the same integrated circuit. In certain embodiments, the eMMC 310 may also be communicatively linked, such as via an interface, to a host device 303. The eMMC 310 may be configured to support functions including, but not limited to, various command classes, command queues, hardware reset signals, high speed boot operations, multiple partition configurability, high-priority interrupt, JEDEC and device health reports, background operations, reliable write, power-off and sleep mode notifications, among other features. In certain embodiments, the eMMC 310 may be configured to support a variety of security features, including, but not limited to, temporary, power-on, and permanent write protection, replay-protected memory block (RPBM), field firmware update, data removal (e.g., erase, trim, discard, sanitize), Micron Authenta™ cryptographic feature set, and other security features. The eMMC 310 may be configured to support MMC system specifications. The Micron Authenta™ cryptographic feature set may provide system level security by offering cryptographic access control and authentication to a host system through public and private keys, signatures, counters, or a combination thereof. In certain embodiments, the cryptographic feature set may be enabled by the host device 303, controller 320, or a combination thereof.

In certain embodiments, the MMC controller 320 may be configured to manage the MMC communication protocol between eMMC 310 and other devices, systems, or a combination thereof. The MMC controller 320 may also be configured to handle block management functions such as logical block allocation and wear leveling. Such management functions may require complex algorithms and may depend entirely on NAND flash technology (generation or memory cell type). The eMMC 310 may handle such management functions internally, thereby making the functions invisible to a host device, such as host device 303. The eMMC 310 may also be configured to conduct defect and error management and may replace defective blocks with spare blocks. The MMC controller 320 may be configured to communicate with the NAND Flash 350 via an interface 345. In certain embodiments, the controller 320 of the eMMC 310 may be configured to control access to the NAND Flash 350. In certain embodiments, data is provided by controller 320 to the NAND Flash 350, such as by utilizing memory interface 345. For example, the user data may be obtained from the host device 303 to be stored in the NAND Flash 350.

In certain embodiments, the MMC controller 320 may be configured to contain any number of registers to support the functionality of the eMMC 310. Such registers may include, but are not limited to, an operation conditions register 332, a card identification register 334, a card-specific data register 336, an extended card-specific data register 338, a relative card address register 340, a driver stage register 342, any other registers, or a combination thereof. In certain embodiments, the operation conditions register 332 may be configured to store a voltage profile of the eMMC 310 and an access mode indication. The operation conditions register 332 may also include a status information bit (e.g., to signify power on or off). In certain embodiments, the card identification register 334 may be configured to be 128 bits wide and may contain device identification information used during the card identification phase required by eMMC protocol. Each device (e.g., eMMC 310) may be created with a unique identification number. In certain embodiments parameters of the card identification register 334 may include a manufacturer ID, OEM/application ID, product name, product revision number, product serial number, manufacturing data, checksum, other parameters, or a combination thereof.

The card-specific data register 336 may provide information about accessing device contents. Additionally, the card-specific data register 336 may define the data format, error correction type, maximum data access time, and data transfer speed, as well as whether a DS register may be used. The extended card-specific data register 338 may define device properties and selected modes for the eMMC 310. The extended card-specific data register 338 may include a properties segment defining device capabilities that may not be modified by a host, such as host device 303. The extended card-specific data register 338 may also include a modes segment that may define the configuration in which the eMMC 310 is working. In certain embodiments, a host (e.g., host device 103) may change properties of modes segments using a command. The relative card address register 340 may be configured to carry the card address for the memory. The address may be used for host-card communication after a card identification procedure is conducted. The driver stage register 342 may be configured to configure the memory card output drivers and may be optional.

In certain embodiments, the eMMC 310 may include a NAND Flash 350, any other non-volatile memory, other volatile memory, or a combination thereof. In certain embodiments, the NAND Flash 350 features may be independent of the communication protocol defined by the MMC specification. In certain embodiments, the controller 310 may be configured to handle block management functions, such as, but not limited to, logical block allocation and wear leveling. In certain embodiments, algorithms required by the management functions may depend on the NAND flash 350 (e.g., generation or memory cell type). The NAND Flash 350 may not require power to retain data stored therein. In certain embodiments, NAND Flash 350 may include, for example, two-dimensional NAND (2D NAND) and three-dimensional NAND (3D NAND). In certain embodiments, NAND Flash 350 may include various types of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 230 can include one or more arrays of memory cells such as SLCs, MLCs, TLCs, QLCs, PLCs, or any combination of such. In some embodiments, a particular memory device can include an SLC portion, an MLC portion, a TLC portion, a QLC portion, a PLC portion of memory cells, or a combination thereof. The memory cells can be grouped as pages that can refer to a logical unit of the memory device used to store data. With some types of memory (e.g., NAND Flash 350), pages can be grouped to form blocks.

In certain embodiments, the eMMC 310 may be configured to support authenticated core root of trust for measurement (CRTM), replay protected monotonic counter (RPMC) advanced cryptographic security based on 256-bit HMAC, CRTM feature sets, local and remote provisioning/deprovisioning, cryptographically secured flash digest and block locking, programmable automatic measurement and recover, updating server root keys, electronic signatures (e.g., JEDEC-standard multi-byte signatures), extended device IDs (e.g., two bytes that identify device factory options), or a combination thereof. Device ID data for the eMMC 310 may include a manufacturer ID, a memory type, a memory capacity, a number of remaining ID bytes, an extended device ID, device configuration information, customized factory data (e.g., unique ID code (UID)). The RPMC may be a security feature that enables a secure system boot plus enhanced platform security, and it may be enabled or deactivated. The CRTM feature set may include capabilities including provision/deprovision, cryptographic protection (e.g., symmetric cryptography), cryptographic measurement, and automatic remediation.

In certain embodiments, the eMMC 310 may be configured to include a secure element function (e.g., as implemented by Micron Authenta$^T$m) with keys for encryption/decryption built-in to the flash NAND 350. The secure element function may be built-in during a manufacturing stage of the eMMC 310 by a manufacturer of the eMMC 310. In certain embodiments, security key may be embedded within the memory silicon of the eMMC 310 (e.g., in the NAND Flash 350) and may be utilized to provide access or deny access to the eMMC 310. For example, when attempting to access the eMMC 310 a user may send a request to access the data stored on the eMMC 310. Based on the credential supplied by the first user 101 the NAND Flash 350 may deny access if the credential is incorrect or grant access if the credential is verified.

Operatively, the system 100 may be configured to provide smart lock functionality by implementing security functions at the hardware level (e.g., at the memory level (e.g., eMMC 310 of each device)) of each device in the system 100. In certain embodiments, each device of the smart lock system 100 including, but not limited to, the door station 125, the electronic lock 123, the indoor station 117, the content distributor device 119, the router 115, the first user device 102, second user device 111, or a combination thereof, may include security functions, such as within an eMMC 310 installed within each such device. In certain embodiments, the security functions are provided for the lowest layers of IoT device software starting with the boot process itself. The security function of the memory may utilize symmetric cryptography and encryption (i.e., secret key encryption) which may utilize a single key to encrypt and decrypt data. The public key may be with the manufacturer of the eMMC 310, and the private key may be provided to an authorized customer of the manufacturer (e.g., a customer that may incorporate the memory onto the door station 125, other componentry of the smart lock system 100 for ultimate purchase and use by an end user, or a combination thereof). The customer may be configured to conduct encryption, decryption of data using the key, or a combination thereof. The security function implemented on the memory of the eMMC 310 may be configured to conduct authentication, support message integrity, provide anti-replay functionality, provide data protection, provide data attestation, and verify component identity.

In certain embodiments, an application of the system (e.g., application executing on the first user device 102, an application 165 that may be on a personal computer that may interact with the first user device, or a combination thereof) may be utilized to handle cryptographic keys so that each device containing an eMMC 310 may recognize the corresponding eMMC 310 installed in another device of the smart lock system 100 (e.g., eMMC 310 in door station 125 may recognize the eMMC 310 in the indoor station 117). In certain embodiments, the application itself may not have the key(s) for the system 100, but, instead, may serve as the mechanism by which keys may be transferred from one device of the system 100 to another. The keys (i.e., cryptographic keys) may be stored on the devices with the eMMCs 310 (e.g., door station 125, electronic lock device 123, indoor station 117, content distributor device 119, etc.). In certain embodiments, the customer (i.e., one that purchases the eMMC 310 from the manufacturer to install it on one or more of the devices of the system 100) may be able to provide the necessary signatures to activate all the components of the system 100. Each eMMC 310 may be enabled to function as a secure system or as a simple EMMC so that the system 100 itself may be utilize by those who can send the signatures. In certain embodiments, the electronic lock manufacturer of the electronic lock device 123 (and other manufacturers of the other devices of the system 100 incorporating an eMMC 310) may facilitate implementation of the smart lock system 100 since the application on the end user's first user device 102 may address identifiers and the customer (e.g., electronic lock manufacturer) may program the signature during installation for the first time and only the installer (e.g., electronic lock manufacturer) can manage the signatures, keys, or a combination thereof.

In certain embodiments, the signatures (which may include the keys) may be utilized during a validation step (i.e., to validate a particular eMMC 310 and potentially other devices as being part of the system 100 instead of a tampered device or other devices that are not part of the system 100) to verify that all parts of a device are the original parts and that the parts have not been modified, changed, replaced, or a combination thereof. For example, one device may validate another device in the smart lock system 100 and verify, during the validation process, that all of the parts of the other device have not been tampered with, are original, or a combination thereof. If each device has its own signature, then the more devices that have signatures, the greater the security level provided by the smart lock system 100. In certain embodiments, in order to make a memory operate, a command may need to be provided to activate its operation. In certain embodiments, the command may be formed by an operating code with parameters. In certain embodiments, using the eMMC 310 the signature may be added to the opcode and to the parameters calculated as signature=MAC (Opcode|Parameters, Secret Key). In certain embodiments, the signature may contain a unique identification device (UID), unique device secret (UDS), and a server root key (SRK). In certain embodiments, these keys may be loaded into the eMMC 310 during production of the eMMC 310 by a manufacturer. The keys may then be transferred from the manufacturer to the customer (e.g., customer may be the companies that make the devices in the system 100; for example, in the case of the door station 126, the customer may be the company that makes the door station 126, the company that installs the system 100 at the first user's 101 home, or a combination thereof), and the transfer may be made available using specific secure key management companies. The signature may calculate HMAC256 (UID+UDS+SRK), for example. In certain embodiments, using the CRTM feature, the signature may be UID (Unique device identification, Factory, Micron)+Server Root Key (Factory, Micron)+Unique Device Secret (Micron Factory). Such keys may be provided to the customer after purchase of the eMMC 310 for installation into a device by the customer, such as into the door station 125. In certain embodiments, the signature may be the manufacturer's name concatenated with a thing name, which may be represented in hexadecimal form. A manufacturer may use a UDS for a class or set of items (e.g., eMMC 310) that are produced. In certain embodiments, each eMMC 310 may have its own unique UDS.

In certain embodiments, the UDS may represent an identity of the memory device 230; and a cryptographic key derived from the UDS can be representative of an owner privilege to operate the eMMC 310 and thus have secure commands executed in the eMMC 310. In certain embodiments, the UDS can be secured within the eMMC 310 such that after the completion of the manufacture of the eMMC 310, the unique device secret may not be communicated to outside of the eMMC 310 and not readable by a host system (e.g. host device 303) via any interface of the eMMC 310. In certain embodiments, the presence of the UDS in the eMMC 310 can be verified by a security server, other devices, or a combination thereof, in the smart lock system 100 through cryptographic computations, such as generation of cryptographic keys, generation of a hash value of a message using a cryptographic function, and generation of a cipher text of a message through encryption of the message using a cryptographic key. The cryptographic computation of encrypting a message using a cryptographic key may involve the computation of a cipher text to represent the message. The message can be recovered efficiently from the cipher text using a corresponding cryptographic key by performing a predefined decryption computation. Without the corresponding cryptographic key for decryption, it may be impractical to recover the message from the cipher text. The level of difficulty to recover the message without the knowledge of the corresponding cryptographic key for decryption may represent the security level of the encryption computation. The security level depends generally on the length of the cryptographic key used in encryption and the algorithm used in the encryption. When symmetric cryptography is used, as may be in the system 100, the cryptographic key for decryption and the cryptographic key for encryption may be the same.

In certain embodiments, a command can include an opcode and a command type configured to provision/activate security features providing CRTM. Such a command may include a field to specify a nonce, and a field to specify a signature for the command. The command may further include a field to specify the current value of a predetermined monotonic counter in the secure memory device. The signature may be generated for a message that includes the nonce using an SRK. In response, if the secure memory device (e.g., eMMC 310) is not already provisioned, the eMMC 310 can use the nonce to generate a root key, and activate access control based on cryptography and deactivate other locking/access control. As an example, a command can include an opcode and a command type configured to deprovision/deactivate security features providing CRTM. Such a command can include a field to specify the current value of a predetermined monotonic counter in the secure memory device, and a field to specify a signature for the command. The signature may be generated for the command content (other than the signature itself) using a server root key. In response, if the secure memory device is not already deprovisioned, the eMMC 310 can deactivate access control based on cryptography and allow activation of other locking/access control. In certain embodiments, a command can include an opcode and a command type configured to request that eMMC 310 provide a unique ID (UID) of the eMMC 310. Such a command can include a field to specify a nonce (e.g., random number), but may not require a signature for the command. In response, the eMMC 310 may provide its UID with an HMAC (e.g. HMAC256) signature for a message that includes the nonce and the UID. In certain embodiments, when the eMMC 310 is at the factory, secrets (e.g., SRK) and UDS, UID, or a combination thereof) of a first root-of-trust may be injected into the eMMC 310 NAND Flash 350. A copy of the secrets may be stored into a key management server (105) (e.g., with an identification of the eMMC 310 via a secure connection between the factory and the key management server. Notably, the eMMC 310 may incorporate any of the features and functionality of Micron's Authenta™, and any information associated with the operative functionality and features of Micron's Authenta™ are incorporated herein by reference.

Figure 4:
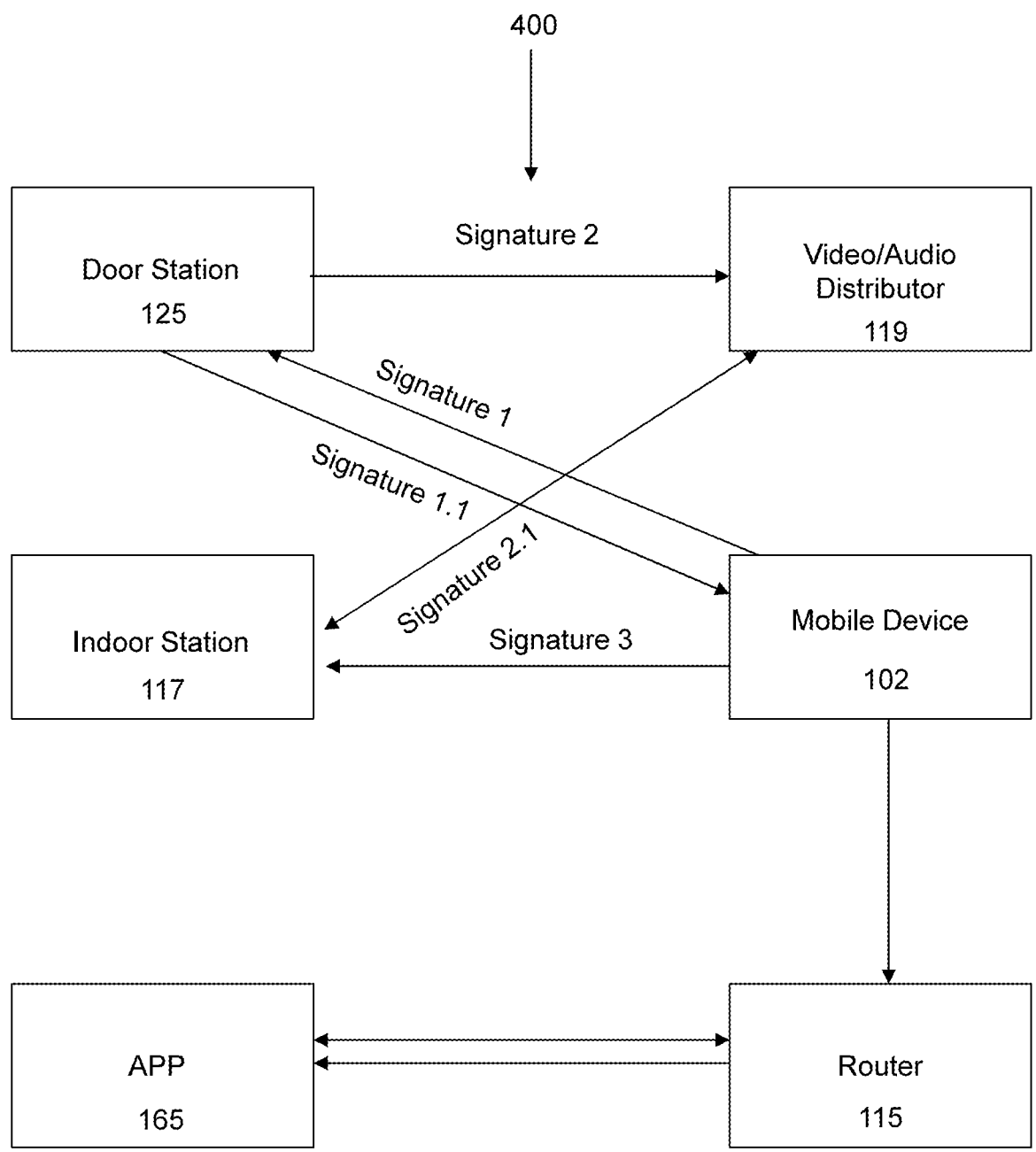
FIG. 4 illustrates a schematic diagram illustrating use of commands and signatures to authenticate and activate devices in a system for providing smart locking according to embodiments of the present disclosure.

Referring now also to FIG. 4, a diagram illustrating use of commands and signatures (e.g., signatures 1, 1.1, 2, 2.3, and 3) to authenticate and activate devices in a system 100 for providing smart locking according to embodiments of the present disclosure is shown. In an initial step the smart lock system 100 may be activated, such as by utilizing the first user device 102 (e.g., a smartphone or electronic key) by sending a command and signature for the first user device 102 containing the eMMC 310 to the door station 125, such as by utilizing an application 165, an application executing on the first user device 102, or a combination thereof. In certain embodiments, the sending may comprise using the router 115 to facilitate transfer of the command (e.g., to activate an eMMC 310) and signature to the door station 125. The eMMC 310 of the door station 125 may be activated with HMAC256 to recognize the eMMC 310 installed in the first user device 102 (e.g., smartphone or electronic key). In certain embodiments, the door station 125 may recognize the eMMC 310 installed in the first user device 102 and sends a key command result and signature to the eMMC 310. In certain embodiments, each eMMC 310 installed in each device of the smart lock system 100 may use HMAC256 cryptography to send commands (e.g., to activate an eMMC 310 of another device in the system 100) and signatures between and among each eMMC 310 in each device of the system 100 so all devices in the system 100 will be activated based on the signatures and if the signatures are recognized by one or more eMMCs 310. In certain embodiments, if a signature is not recognized, that may mean that one or more components of a device providing the command and signature may have been tampered with, replaced, modified, or may have failed. In such a scenario, the eMMC 310 may not be activated because the device providing the command and signature may not be verified, may not be authenticated, may be compromised, or a combination thereof. In certain embodiments, the sending of commands, signatures, or a combination thereof, may be handled by the application 165, by an application on the first user device 102, or a combination thereof, which may be configured not to know the commands or signatures, but may be made aware of the order of sending of commands and signatures so that certain devices are activated before others in the sequence. In certain embodiments, the customer may activate the eMMC 310 using the signatures and commands may be utilized to activate or deactivate eMMCs 310 of the system 100.

For example, the first user device (e.g. electronic key) may activate the eMMC 310 on the camera of the indoor station 117 (or deactivate the camera), the eMMC 310 of the camera may activate the eMMC 310 of the motion sensor of the door station 125 (or deactivate the sensor), the eMMC 310 of the sensor may then be utilized to activate the eMMC 310 of the electronic lock device 123. Additionally, activation, deactivation, or a combination thereof, may occur based on the occurrence of conditions, the detection of activities, individuals, occurrences, or a combination thereof. For example, if it is desired that in the next five minutes no one else can pass through the access gate (main door of the house of first user 101), a sensor may be installed which counts the people who pass through the gate, and the sensor may be activated for a further 5 minutes until the electronic lock device 123 eMMC 310 sends the command and signature to the eMMC 310 to deactivate itself. In certain embodiments, the commands, signatures, or a combination thereof, can be transmitted from the application, but these may be loaded into the eMMC 310 during the installation by the customer incorporating the eMMC 310 into the devices of the smart lock system 100.

In certain embodiments, the each eMMC 310 may utilize HMAC (e.g., HMAC256) to send command and signatures between each device of the smart lock system 100 to cover authentication, message integrity, anti-replay, data protection, data attestation, and component identity verification (e.g. signature may be utilized to identify original components installed by the manufacturer during fabrication of the eMMC 310; if not original, then a tampering or replacement may have occurred). Additionally, in certain embodiments, eMMCs 310 of the devices of the lock system 100 may be activated based on detection of activities, individuals, items, or a combination thereof. In certain embodiments, activities may include, but are not limited to, an intrusion into any area of an environment being monitored (e.g., first user's 101 home), a theft of an item in or around the environment, aggressive behavior detected in the environment, a threat or threatening behavior detected in the environment (e.g., an individual brandishing a weapon or performing aggressive movements, an individual swinging or manipulating a weapon in the environment, an individual speaking words that are threatening (e.g. detected words such as kill, attack, beat, etc.)), an attempted or successful cyber-attack of devices in or around the environment, trespassing of an individual detected in or around the environment, motion detected in the environment, any type of activity occurring within or around the environment, or a combination thereof. In certain embodiments, for example, the eMMCs 310 of the devices may be activated based on detection by a device of the system 100 of a suspicious individual or a match of the individual with a known criminal, based on detection by a device of the system 100 of an intrusion (e.g. motion sensor of door station 125 was activated and so indoor station 117, content distributor device 119, or a combination thereof, are activated to record activity occurring in the house and transmit the information (e.g., content) to authorities that can respond to the intrusion), based on detection by a device of the system 100 that an unauthorized device is attempting to lock or unlock the electronic lock device 123, based on detection that a neighbor's smart lock system or other security system has been intruded, based on any other condition or detection, or a combination thereof. In certain embodiments, eMMCs 310 of each device may be activated to facilitate verification that an illegal activity has occurred. For example, if the motion sensor of the door station 125 detects motion and the motion sensor activates the indoor station 117 camera, the indoor station 117 camera may verify via the camera that an intruder broke into the home instead of an animal being at the front door. Notably, each device may be activated in any desired sequence or order and any number of devices, type of devices, or a combination thereof, may be included in the smart lock system 100.

Figure 5:
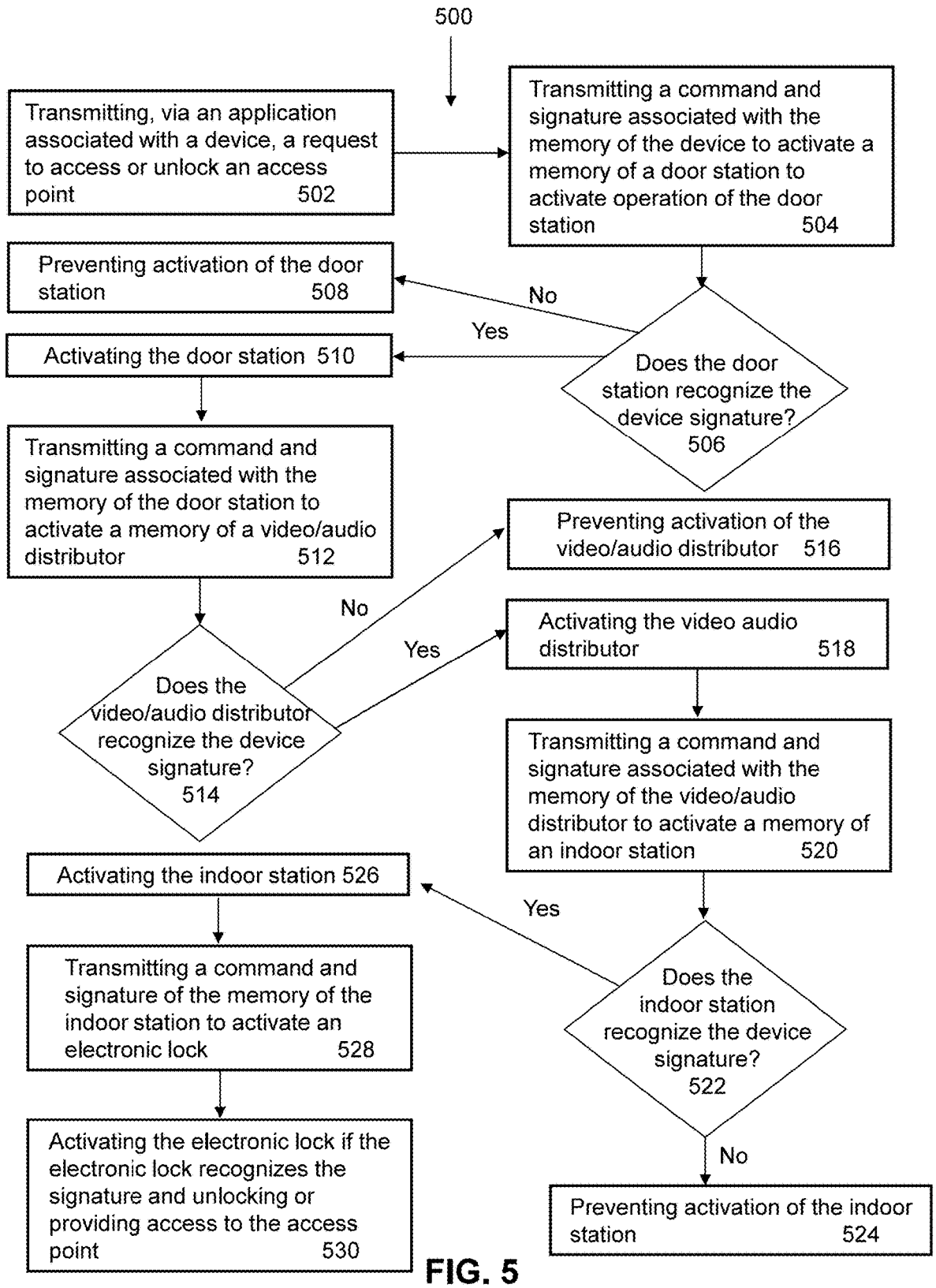
FIG. 5 shows an exemplary method for providing a smart lock system according to embodiments of the present disclosure.

Referring now also to FIG. 5, FIG. 5 illustrates a method 500 for providing and utilizing a smart lock system 100 according to embodiments of the present disclosure. For example, the method of FIG. 5 can be implemented in the system of FIG. 1, any of the other systems illustrated in the Figures, or a combination thereof. In certain embodiments, the method of FIG. 4 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In certain embodiments, the method of FIG. 5 is performed at least in part by one or more processing devices (e.g., controller 320 of FIG. 3). Although shown in a particular sequence or order, unless otherwise specified, the order of the processes may be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At step 502, the method 500 may include transmitting, such as via an application associated with a device (e.g., first user device 102) a request to access or unlock (or lock) an access point. The request, for example, may be initiated based on the first user 101 interacting with a user interface of the application and submitting an input into the user interface to initiate the request (e.g., initiating an unlock command). In certain embodiments, the application may be an application that controls the smart lock system 100. At step 504, the method 500 may include transmitting a command and signature associated with the memory of the first user device 102 to activate a memory of a door station 125 to activate operation of the door station 125. In certain embodiments, the command may be to activate the door station 125, other devices of the smart lock system 100, or a combination thereof. At step 506, the method 500 may include determining whether the door station 125 recognized the signature of the device (i.e., the first user device 102 in this example). If the door station 125 does not recognize the signature, the method 500 may proceed to step 508, which may include preventing activation of the door station 508. If, however, at step 506, the door station recognizes the signature of the requesting device, the method 500 may proceed to step 510. At step 510, the method 500 may include activating the memory of the door station 125 to activate operation of the door station 125. For example, the door station 125 camera may operate and obtain information, such as content of the environment within which the first user's 101 home is located in.

At step 512, the method 500 may include transmitting a command and signature associated with the memory of the door station 125 to activate a memory of a content distributor device 119. At step 514, the method 500 may include determining if the content distributor device 119 recognizes the signature associated with door station 125. If the content distributor device 119 does not recognize the signature of the door station 125, the method 500 may proceed to step 516, which may include preventing the activation of the content distributor device 119. If, however, at step 514, the content distributor device 119 does recognize the signature of the door station 125, the method 500 may proceed to step 518, which may include activating the content distributor device 119. At step 520, the method 500 may include transmitting a command and signature associated with the memory of the content distributor device 119 to activate a memory of the indoor station 117. At step 522, the method 500 may include determining whether the indoor station 117 recognizes the device signature of the content distributor device 119. If indoor station 117 does not recognize the signature of the content distributor device 119, the method 500 may include proceeding to step 524, which may include preventing activation of the indoor station 117. If, however, at step 522 the indoor station 117 recognizes the signature of the content distributor device 119, the method 500 may proceed to step 526.

At step 526, the method 500 may include activating the indoor station 117. At step 528, the method 500 may include transmitting a command signature of the memory of the indoor station 117 to activate an electronic lock device 123 of the system 100. At step 530, the method 500 may include activating the electronic lock device 1234 if the electronic lock device 123 recognizes the signature of the indoor station 117. The method 500 may also include unlocking or providing access to the access point, such as by causing the electronic lock device 123 to unlock or otherwise provide access to the access point. Notably, the method 500 may incorporate any of the features and functionality of the system 100. For example, the method 500 may be utilized to lock the electronic lock device 123, cause the indoor station 117, door station 125, or a combination thereof, to record information, such as media content of an environment in which the electronic lock 123 is located, transmit alerts to authorities to verify a potential intrusion at a location (e.g., a home of the first user 101), deactivate any of the devices of the system 100, transmit media content to authorities for review, perform any of the other operations of the system 100, or a combination thereof.

Figure 6:
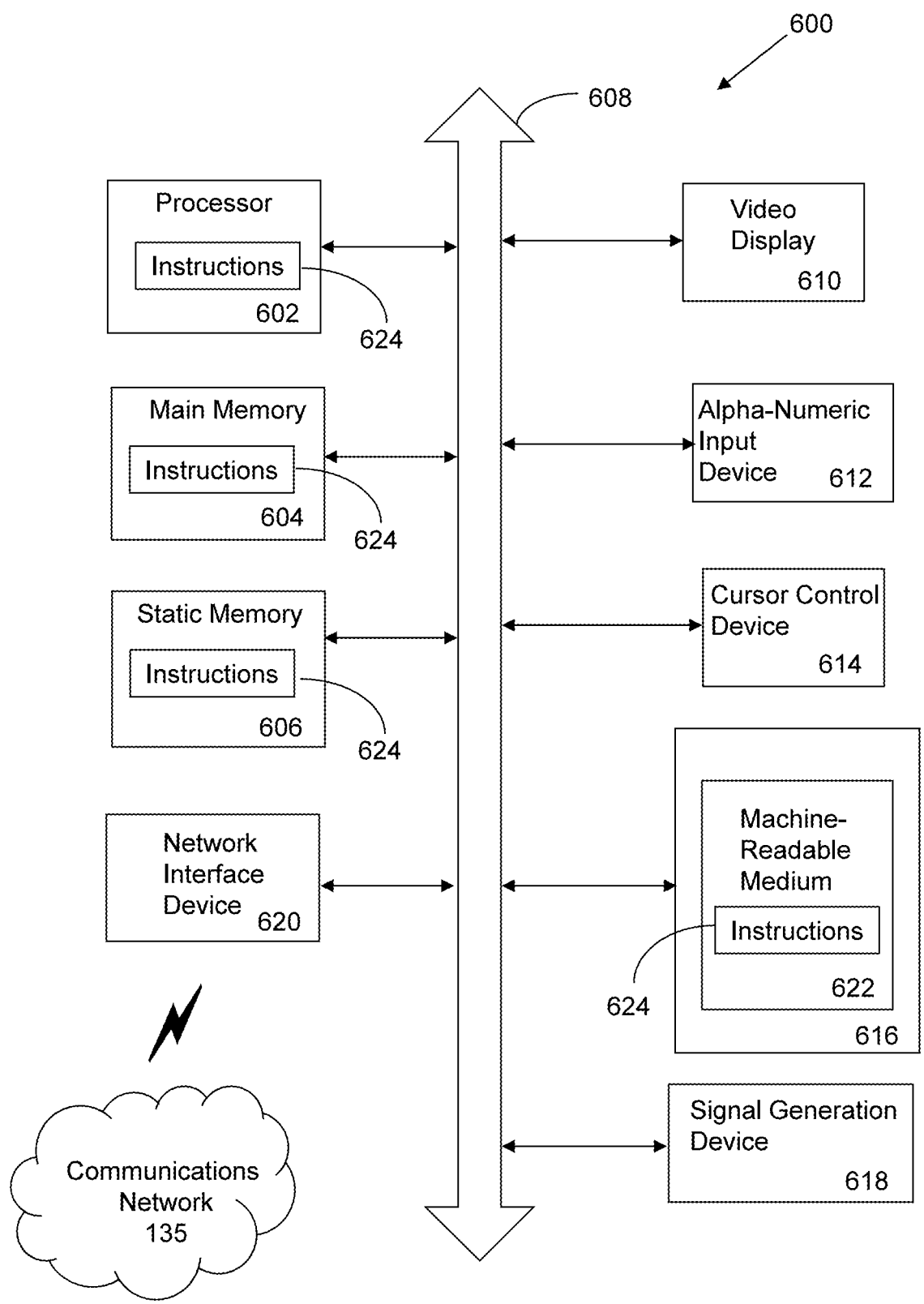
FIG. 6 illustrates a schematic diagram of a machine in the form of a computer system within which a set of instructions, when executed, may cause the machine to facilitate functionality of a smart lock system according to embodiments of the present disclosure.

Referring now also to FIG. 6, at least a portion of the methodologies and techniques described with respect to the exemplary embodiments of the system 100, method 500, or a combination thereof, can incorporate a machine, such as, but not limited to, computer system 600, or other computing device within which a set of instructions, when executed, may cause the machine to perform any one or more of the methodologies or functions discussed above. The machine may be configured to facilitate various operations conducted by the system 100. For example, the machine may be configured to, but is not limited to, assist the system 100 by providing processing power to assist with processing loads experienced in the system 100, by providing storage capacity for storing instructions or data traversing the system 100, or by assisting with any other operations conducted by or within the system 100. As another example, in certain embodiments, the computer system 600 may assist with transmitting requests to access an access point, unlock an access point, transmitting commands and signatures, preventing activation of devices of the smart lock system 100, facilitating activation of devices of the smart lock system 100, alerting authorities of suspicious activities detected by devices and systems of the smart lock system 100, recording media content, analyzing information gathered by devices of the system 100, performing any other operations of the system 100, or a combination thereof.

In some embodiments, the machine may operate as a standalone device. In some embodiments, the machine may be connected (e.g., using communications network 135, another network, or a combination thereof) to and assist with operations performed by other machines and systems, such as, but not limited to, the first user device 102, the second user device 111, the door station 125, the indoor station 117, the router 115, the electric lock 123, the content distributor device 119, the power adapter 121, the server 140, the server 145, the server 150, the database 155, the server 160, the host device 303, the memory device 310, any other system, program, device, or any combination thereof. The machine may be connected with any component in the system 100. In a networked deployment, the machine may operate in the capacity of a server or a client user machine in a server-client user network environment, or as a peer machine in a peer-to-peer (or distributed) network environment. The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The computer system 600 may include a processor 602 (e.g., a central processing unit (CPU), a graphics processing unit (GPU, or both), a main memory 604 and a static memory 606, which communicate with each other via a bus 608. The computer system 600 may further include a video display unit 610, which may be, but is not limited to, a liquid crystal display (LCD), a flat panel, a solid-state display, or a cathode ray tube (CRT). The computer system 800 may include an input device 612, such as, but not limited to, a keyboard, a cursor control device 614, such as, but not limited to, a mouse, a disk drive unit 616, a signal generation device 618, such as, but not limited to, a speaker or remote control, and a network interface device 620.

In certain embodiments, main memory 604, static memory 606 (e.g., read-only memory (ROM), flash memory, dynamic random-access memory (DRAM) such as synchronous DRAM (SDRAM) or Rambus DRAM (RDRAM), static random access memory (SRAM), etc.), and a data storage system 618, or a combination thereof may be configured to communicate with each other via a bus 608 (which can include multiple buses). In certain embodiments, processor 602 may represent one or more general-purpose processing devices such as a microprocessor, a central processing unit, or the like. More particularly, the processing device may be a complex instruction set computing (CISC) microprocessor, reduced instruction set computing (RISC) microprocessor, very long instruction word (VLIW) microprocessor, or a processor implementing other instruction sets, or processors implementing a combination of instruction sets. In certain embodiments, the processor 602 may also be one or more special-purpose processing devices such as an application specific integrated circuit (ASIC), a field programmable gate array (FPGA), a digital signal processor (DSP), network processor, or the like. The processor 602 may be configured to execute instructions 626 for performing the operations and steps discussed herein.

The disk drive unit 616 may include a machine-readable medium 622 on which is stored one or more sets of instructions 624, such as, but not limited to, software embodying any one or more of the methodologies or functions described herein, including those methods illustrated above. The instructions 624 may also reside, completely or at least partially, within the main memory 604, the static memory 606, or within the processor 602, or a combination thereof, during execution thereof by the computer system 600. The main memory 604 and the processor 602 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine-readable medium 622 containing instructions 624 so that a device connected to the communications network 135, another network, or a combination thereof, can send or receive voice, video or data, and communicate over the communications network 135, another network, or a combination thereof, using the instructions. The instructions 624 may further be transmitted or received over the communications network 135, another network, or a combination thereof, via the network interface device 620.

While the machine-readable medium 622 is shown in an example embodiment to be a single medium, the term "machine-readable medium" should be taken to include a single medium or multiple media (e.g., a centralized or distributed database, associated caches and servers, or a combination thereof) that store the one or more sets of instructions. The term "machine-readable medium" shall also be taken to include any medium that is capable of storing, encoding or carrying a set of instructions for execution by the machine and that causes the machine to perform any one or more of the methodologies of the present disclosure.

The terms "machine-readable medium," "machine-readable device," or "computer-readable device" shall accordingly be taken to include, but not be limited to: memory devices, solid-state memories such as a memory card or other package that houses one or more read-only (non-volatile) memories, random access memories, or other re-writable (volatile) memories; magneto-optical or optical medium such as a disk or tape; or other self-contained information archive or set of archives is considered a distribution medium equivalent to a tangible storage medium. The "machine-readable medium," "machine-readable device," or "computer-readable device" may be non-transitory, and, in certain embodiments, may not include a wave or signal per se. Accordingly, the disclosure is considered to include any one or more of a machine-readable medium or a distribution medium, as listed herein and including art-recognized equivalents and successor media, in which the software implementations herein are stored.

The disclosure includes various devices which perform the methods and implement the systems described above, including data processing systems which perform the methods, and computer-readable media containing instructions which when executed on data processing systems cause the systems to perform the methods.

The description and drawings are illustrative and are not to be construed as limiting. Numerous specific details are described to provide a thorough understanding. However, in certain instances, well-known or conventional details are not described in order to avoid obscuring the description. References to one or an embodiment in the present disclosure are not necessarily references to the same embodiment; and, such references mean at least one.

As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

Reference in this specification to "one embodiment" or "an embodiment" means that a particular feature, structure, or characteristic described in connection with the embodiment is included in at least one embodiment of the disclosure. The appearances of the phrases "in one embodiment" and "in certain embodiments" in various places in the specification are not necessarily all referring to the same embodiment(s), nor are separate or alternative embodiments mutually exclusive of other embodiments. Moreover, various features are described which may be exhibited by some embodiments and not by others. Similarly, various requirements are described which may be requirements for some embodiments, but not other embodiments.

In this description, various functions, operations, or a combination thereof, may be described as being performed by or caused by software code to simplify description. However, those skilled in the art will recognize what is meant by such expressions is that the functions, operations, or a combination thereof, result from execution of the code by one or more processing devices, such as a microprocessor, Application-Specific Integrated Circuit (ASIC), graphics processor, a Field-Programmable Gate Array (FPGA), or a combination thereof. Alternatively, or in combination, the functions and operations can be implemented using special purpose circuitry (e.g., logic circuitry), with or without software instructions. Embodiments can be implemented using hardwired circuitry without software instructions, or in combination with software instructions. Thus, the techniques are not limited to any specific combination of hardware circuitry and software, nor to any particular source for the instructions executed by a computing device.

While some embodiments can be implemented in fully functioning computers and computer systems, various embodiments are capable of being distributed as a computing product in a variety of forms and are capable of being applied regardless of the particular type of computer-readable medium used to actually effect the distribution.

At least some aspects disclosed can be embodied, at least in part, in software. That is, the techniques may be carried out in a computing device or other system in response to its processing device, such as a microprocessor, executing sequences of instructions contained in a memory, such as ROM, volatile RAM, non-volatile memory, cache or a remote storage device.

Routines executed to implement the embodiments may be implemented as part of an operating system, middleware, service delivery platform, SDK (Software Development Kit) component, web services, or other specific application, component, program, object, module or sequence of instructions (sometimes referred to as computer programs). Invocation interfaces to these routines can be exposed to a software development community as an API (Application Programming Interface). The computer programs typically comprise one or more instructions set at various times in various memory and storage devices in a computer, and that, when read and executed by one or more processors in a computer, cause the computer to perform operations necessary to execute elements involving the various aspects.

A computer-readable medium can be used to store software and data which when executed by a computing device causes the device to perform various methods. The executable software and data may be stored in various places including, for example, ROM, volatile RAM, non-volatile memory, cache, or a combination thereof. Portions of this software, data, or a combination thereof, may be stored in any one of these storage devices. Further, the data and instructions can be obtained from centralized servers or peer to peer networks. Different portions of the data and instructions can be obtained from different centralized servers and peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a computer-readable medium in entirety at a particular instance of time.

Examples of computer-readable media include, but are not limited to, recordable and non-recordable type media such as volatile and non-volatile memory devices, read only memory (ROM), random access memory (RAM), flash memory devices, solid-state drive storage media, removable disks, magnetic disk storage media, optical storage media (e.g., Compact Disk Read-Only Memory (CD ROMs), Digital Versatile Disks (DVDs), etc.), among others. The computer-readable media may store the instructions. Other examples of computer-readable media include, but are not limited to, non-volatile embedded devices using NOR flash or NAND flash architectures. Media used in these architectures may include un-managed NAND devices, and managed NAND devices, including, for example, eMMC, SD, CF, UFS, and SSD.

In general, a non-transitory computer-readable medium includes any mechanism that provides (e.g., stores) information in a form accessible by a computing device (e.g., a computer, mobile device, network device, personal digital assistant, manufacturing tool having a controller, any device with a set of one or more processors, etc.). A "computer-readable medium" as used herein may include a single medium or multiple media (e.g., that store one or more sets of instructions).

In various embodiments, hardwired circuitry may be used in combination with software and firmware instructions to implement the techniques. Thus, the techniques are neither limited to any specific combination of hardware circuitry and software nor to any particular source for the instructions executed by a computing device.

Various embodiments set forth herein can be implemented using a wide variety of different types of computing devices. As used herein, examples of a "computing device" include, but are not limited to, a server, a centralized computing platform, a system of multiple computing processors and components, a mobile device, a user terminal, a vehicle, a personal communications device, a wearable digital device, an electronic kiosk, a general purpose computer, an electronic document reader, a tablet, a laptop computer, a smartphone, a digital camera, a residential domestic appliance, a television, or a digital music player. Additional examples of computing devices include devices that are part of what is called "the internet of things" (IOT). Such "things" may have occasional interactions with their owners or administrators, who may monitor the things or modify settings on these things. In some cases, such owners or administrators play the role of users with respect to the "thing" devices. In some examples, the primary mobile device (e.g., an Apple iPhone) of a user may be an administrator server with respect to a paired "thing" device that is worn by the user (e.g., an Apple watch).

In some embodiments, the computing device can be a computer or host system, which is implemented, for example, as a desktop computer, laptop computer, network server, mobile device, or other computing device that includes a memory and a processing device. The host system can include or be coupled to a memory sub-system so that the host system can read data from or write data to the memory sub-system. The host system can be coupled to the memory sub-system via a physical host interface. In general, the host system can access multiple memory sub-systems via a same communication connection, multiple separate communication connections, or a combination of communication connections.

In some embodiments, the computing device is a system including one or more processing devices. Examples of the processing device can include a microcontroller, a central processing unit (CPU), special purpose logic circuitry (e.g., a field programmable gate array (FPGA), an application specific integrated circuit (ASIC), etc.), a system on a chip (SoC), or another suitable processor.

In one example, a computing device is a controller of a memory system. The controller includes a processing device and memory containing instructions executed by the processing device to control various operations of the memory system.

The illustrations of arrangements described herein are intended to provide a general understanding of the structure of various embodiments, and they are not intended to serve as a complete description of all the elements and features of apparatus and systems that might make use of the structures described herein. Other arrangements may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Thus, although specific arrangements have been illustrated and described herein, it should be appreciated that any arrangement calculated to achieve the same purpose may be substituted for the specific arrangement shown. This disclosure is intended to cover any and all adaptations or variations of various embodiments and arrangements of the invention. Combinations of the above arrangements, and other arrangements not specifically described herein, will be apparent to those of skill in the art upon reviewing the above description. Therefore, it is intended that the disclosure not be limited to the particular arrangement(s) disclosed as the best mode contemplated for carrying out this invention, but that the invention will include all embodiments and arrangements falling within the scope of the appended claims.

The foregoing is provided for purposes of illustrating, explaining, and describing embodiments of this invention. Modifications and adaptations to these embodiments will be apparent to those skilled in the art and may be made without departing from the scope or spirit of this invention. Upon reviewing the aforementioned embodiments, it would be evident to an artisan with ordinary skill in the art that said embodiments can be modified, reduced, or enhanced without departing from the scope and spirit of the claims described below.

What is claimed is:

1. A system, comprising:
   a computing device comprising a first memory device and a controller, wherein the controller is configured to:
   transmit, via an application associated with the computing device, a request to access or unlock an access point;
   transmit, to a door station device, a command and signature associated with the first memory device to activate a second memory of the door station device;
   activate, if the door station device recognizes the signature associated with the first memory device, the second memory of the door station device to activate the door station device;
   transmit, to an indoor station device, a command and signature associated with the second memory device to activate a third memory of the indoor station device;
   activate, if the indoor station device recognizes the signature associated with the second memory device, the third memory of the indoor station device to activate the indoor station device;
   transmit, to an electronic lock device, a command and signature associated with the third memory device to activate a fourth memory of the electronic lock device; and
   activate, if the electronic lock device recognizes the signature associated with the third memory device, the fourth memory of the electronic lock device to activate the electronic lock device; and
   provide access to the access point or unlocking the access point using the electronic lock device.

2. The system of claim 1, wherein the controller is further configured to transmit, to a content distributor device, a command and signature associated with the second memory device to activate a fifth memory of the content distributor device; and
   activate, if the content distributor device recognizes the signature associated with the second memory device, the fifth memory of the content distributor device to activate the content distributor device.

3. The system of claim 1, wherein the controller is further configured to utilize the application to transmit the command and signature associated with the first memory device, the second memory device, the third memory device, the fourth memory device, or a combination thereof.

4. The system of claim 1, wherein the controller is further configured to record information associated with an environment in which the access point is located after activation of the door station device, a content distributor device, the indoor station device, the electronic lock device, or a combination thereof.

5. The system of claim 4, wherein the controller is further configured to detect an activity, an object, a person, a threat, or a combination thereof, based on analyzing the information recorded that is associated with the environment.

6. The system of claim 5, wherein the controller is further configured to transmit an alert, the information, or both, to a third-party system to verify the activity, the object, the person, the threat, or a combination thereof.

7. The system of claim 1, wherein the controller is further configured to prevent activation of the door station device if the door station device does not recognize the signature associated with the first memory device, prevent activation of a content distributor device if a content distributor device does not recognize the signature associated with the second memory device, prevent activation of the indoor station if the indoor station device does not recognize the signature associated with the second memory device, prevent activation of the electronic lock device if the electronic lock device does not recognize the signature associated with the third memory device, or a combination thereof.

8. The system of claim 1, wherein the controller is further configured to utilize a hash-based authentication code to transmit the command and signature associated with the first memory device.

9. The system of claim 1, wherein the controller is further configured to transmit the command and signature by utilizing a short-range wireless protocol, a WiFi connection, a Z-wave connection, an Internet of Things connection, or a combination thereof.

10. The system of claim 1, wherein the controller is further configured to deactivate the indoor station device, a content distributor device, the door station device, the electronic lock device, or a combination thereof, in response to expiration of a time period, detection of an illegal activity, identification of a person of interest, or a combination thereof.

11. The system of claim 1, wherein the signature associated with the first memory device comprises a unique identifier for the first memory device, a unique device secret associated with the first memory device, and a server root key.

12. The system of claim 1, wherein the controller is further configured to verify authenticity of a component of the door station device, a component of a content distributor device, a component of the indoor station device, a component of the electronic lock, or a combination thereof, based on recognizing the signature of the first memory device, the second memory device, the third memory device, or a combination thereof.

13. The system of claim 1, wherein the controller is further configured to activate the door station device, a content distributor device, the indoor station device, the electronic lock, or a combination thereof, upon receiving an alert from a device outside of the system that is in a vicinity of the system.

14. The system of claim 1, wherein the controller is further configured to activate a camera of the door station device upon detection of a motion by a sensor of the door station device.

15. A method, comprising:
  transmitting, via an application associated with a computing device, a request to access or unlock an access point;
  transmitting, to a door station device, a command and signature associated with a first memory device of the computing device to activate a second memory of the door station device;
  activating, if the door station device recognizes the signature associated with the first memory device, the second memory of the door station device to activate the door station device;
  transmitting, to an indoor station device, a command and signature associated with the second memory device to activate a third memory of the indoor station device;
  activating, if the indoor station device recognizes the signature associated with the second memory device, the third memory of the indoor station device to activate the indoor station device;
  transmitting, to an electronic lock device, a command and signature associated with the third memory device to activate a fourth memory of the electronic lock device; and
  activating, if the electronic lock device recognizes the signature associated with the third memory device, the fourth memory of the electronic lock device to activate the electronic lock device; and
  providing access to the access point or unlocking the access point using the electronic lock device.

16. The method of claim 15, further comprising transmitting, to a content distributor device, a command and signature associated with the second memory device to activate a fifth memory of the content distributor device; and
  activating, if the content distributor device recognizes the signature associated with the second memory device, the fifth memory of the content distributor device to activate the content distributor device.

17. The method of claim 15, further comprising receiving a request to lock or prevent access to the access point.

18. The method of claim 15, further comprising providing a different unique device secret for each signature associated with the first memory device, the second memory device, the third memory device, and the fourth memory device.

19. The method of claim 15, further comprising activating the door station, a content distributor device, the indoor station, and the electronic lock device in a specific sequence or order.

20. The method of claim 15, further comprising loading the signature of the first memory device, the signature of the second memory device, the signature of the third memory device, a signature of the fourth memory device, or a combination thereof, during installation of the system.

21. The method of claim 15, further comprising calculating a hash-based authentication code associated with the first memory device based on a unique identifier for the first memory device, a unique device secret associated with the first memory device, and a server root key.

22. A first memory device of a computing device, comprising:
  a controller configured to:
    transmit, via an application associated with the computing device, a request to access or unlock an access point;
    transmit, to a door station device, a command and signature associated with the first memory device to activate a second memory of the door station device;
    activate, if the door station device recognizes the signature associated with the first memory device, the second memory of the door station device to activate the door station device;
    transmit, to an indoor station device, a command and signature associated with the second memory device to activate a third memory of the indoor station device;
    activate, if the indoor station device recognizes the signature associated with the second memory device, the third memory of the indoor station device to activate the indoor station device;
    transmit, to an electronic lock device, a command and signature associated with the third memory device to activate a fourth memory of the electronic lock device; and
    activate, if the electronic lock device recognizes the signature associated with the third memory device, the fourth memory of the electronic lock device to activate the electronic lock device; and
    provide access to the access point or unlocking the access point using the electronic lock device.

\* \* \* \* \*